(12) United States Patent
Khan et al.

(10) Patent No.: US 9,697,514 B2
(45) Date of Patent: *Jul. 4, 2017

(54) SECURE-TRANSACTION NOTIFICATIONS

(71) Applicant: Apple Inc., Cupertino, CA (US)

(72) Inventors: Ahmer A. Khan, Milpitas, CA (US); Zachary A. Rosen, San Francisco, CA (US); Joakim Linde, Palo Alto, CA (US)

(73) Assignee: APPLE INC., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/243,041

(22) Filed: Aug. 22, 2016

(65) Prior Publication Data

US 2016/0358157 A1    Dec. 8, 2016

Related U.S. Application Data

(63) Continuation of application No. 14/474,754, filed on Sep. 2, 2014, now Pat. No. 9,424,568.

(Continued)

(51) Int. Cl.
| | | |
|---|---|---|
| *G06K 5/00* | (2006.01) | |
| *G06Q 20/32* | (2012.01) | |
| *G06Q 20/36* | (2012.01) | |
| *G06Q 20/38* | (2012.01) | |
| *G06Q 20/04* | (2012.01) | |
| *G06Q 20/20* | (2012.01) | |
| *G06Q 20/42* | (2012.01) | |
| *G06Q 20/10* | (2012.01) | |

(52) U.S. Cl.
CPC ....... *G06Q 20/325* (2013.01); *G06Q 20/0453* (2013.01); *G06Q 20/10* (2013.01);
(Continued)

(58) Field of Classification Search
CPC .. G06Q 30/02; G06Q 20/1085; G06Q 20/341; G07F 7/1008; G07F 19/20; G06K 7/10881; G06K 7/10851
(Continued)

(56) References Cited

U.S. PATENT DOCUMENTS

| | | |
|---|---|---|
| 6,550,683 B1 | 4/2003 | Augustine |
| 7,712,670 B2 | 5/2010 | Sauerwein, Jr. et al. |

(Continued)

FOREIGN PATENT DOCUMENTS

| | | |
|---|---|---|
| WO | WO 02/093442 | 11/2002 |
| WO | WO 2008/091065 A1 | 7/2008 |

(Continued)

OTHER PUBLICATIONS

Wikipedia: "Google Wallet—Wikipedia, the free encyclopedia", May 24, 2014, retrieved from the Internet: http/en.wikipedia.org/w/index.phl?title=Google_Wallet&oldid=609951500.
(Continued)

*Primary Examiner* — Karl D Frech
(74) *Attorney, Agent, or Firm* — Sterne, Kessler, Goldstein & Fox P.L.L.C.

(57) ABSTRACT

To facilitate conducting a secure transaction via wireless communication between a portable electronic device (such as a smartphone) and another electronic device (such as a point-of-sale terminal), the portable electronic device may, after a final command is received from the other electronic device, determine a unique transaction identifier for the secure transaction. In particular, the final command may be specific to an applet, stored in a secure element in the portable electronic device, which conducts the secure transaction. The secure element may generate the unique transaction identifier based on financial-account information associated with the applet, which is communicated to the other electronic device. Next, the secure element may provide, to a processor in the portable electronic device, an end message for the secure transaction with the unique transaction identifier.

20 Claims, 7 Drawing Sheets

Related U.S. Application Data

(60) Provisional application No. 62/004,798, filed on May 29, 2014.

(52) U.S. Cl.
CPC ........... *G06Q 20/20* (2013.01); *G06Q 20/322* (2013.01); *G06Q 20/3227* (2013.01); *G06Q 20/3278* (2013.01); *G06Q 20/36* (2013.01); *G06Q 20/385* (2013.01); *G06Q 20/3821* (2013.01); *G06Q 20/425* (2013.01)

(58) Field of Classification Search
USPC .............. 235/375, 379, 380, 462.45, 472.01
See application file for complete search history.

(56) References Cited

U.S. PATENT DOCUMENTS

| | | |
|---|---|---|
| 8,196,131 B1 | 6/2012 | Von Behren et al. |
| 8,615,466 B2 | 12/2013 | Aiglstorfer et al. |
| 8,621,168 B2 | 12/2013 | Von Behren et al. |
| 8,996,867 B2 | 3/2015 | Ji et al. |
| 9,424,568 B2 * | 8/2016 | Khan .................. G06Q 20/322 |
| 2011/0078081 A1 | 3/2011 | Pirzadeh et al. |
| 2013/0317924 A1 | 11/2013 | Bush et al. |
| 2014/0058937 A1 | 2/2014 | Watson |
| 2014/0074714 A1 | 3/2014 | Melone et al. |
| 2014/0101042 A1 | 4/2014 | Grissom et al. |
| 2015/0348000 A1 | 12/2015 | Khan et al. |

FOREIGN PATENT DOCUMENTS

| | | |
|---|---|---|
| WO | WO 2012/091350 A2 | 7/2012 |
| WO | WO 2013/126996 A1 | 9/2013 |

OTHER PUBLICATIONS

Visa: "Visa Mobile Proximity Payment Testing & Compliance Requirements for MicroSD and Mobile Accessories Version 3.1 Effective: Feb. 2014 Classification: Visa Public", Feb. 28, 2014, retrieved from the Internet: https://technologypartner.visa.com/Download.aspx?id=211.

* cited by examiner

SECURE-TRANSACTION NOTIFICATIONS

CROSS-REFERENCE TO RELATED APPLICATIONS

This application is a continuation of U.S. patent application Ser. No. 14/474,754, which was filed on Sep. 2, 2014, and claims priority under 35 U.S.C. §119(e) to U.S. Provisional Application Ser. No. 62/004,798, entitled "Financial-Transaction Notifications," by Zachary A. Rosen and Ahmer A. Khan, filed on May 29, 2014, the contents of which are herein incorporated by reference.

This application is related to U.S. Provisional Application Ser. No. 61/905,035, entitled "Generating Transaction Identifiers," by George R. Dicker, Christopher Sharp, Ahmer A. Khan, Yousuf H. Vaid, Glen Steele, Chris Adams, and David Haggerty, filed on Nov. 15, 2013; and to U.S. Provisional Application Ser. No. 61/905,042, entitled "Electronic Receipts for NFC-Based Financial Transactions," by Yousuf H. Vaid, George R. Dicker, Ahmer A. Khan, Christopher Sharp, Glen W. Steele, Christopher D. Adams, and David Haggerty, filed on Nov. 15, 2013, the contents of both of which are herein incorporated by reference.

BACKGROUND

Field

The described embodiments relate to, inter alia, wireless communications, wireless electronic devices, and techniques for generating identifiers and receipts related to financial transactions conducted by electronic devices via wireless communication.

Related Art

Many modern electronic devices include a networking subsystem that is used to wirelessly communicate with other electronic devices. For example, these electronic devices can include a networking subsystem with a cellular network interface (UMTS, LTE, etc.), a wireless local area network interface (e.g., a wireless network such as described in the Institute of Electrical and Electronics Engineers (IEEE) 802.11 standard or Bluetooth™ from the Bluetooth Special Interest Group of Kirkland, Wash.), and/or another type of wireless interface (such as a near-field-communication interface). Because of the popularity of these electronic devices and the convenience provided by this wireless-communication capability, there is increasing interest in using electronic devices to conduct financial transactions.

One approach for using cellular telephones (and, more generally, portable electronic devices) to conduct financial transactions is based on near-field communication. In particular, during a financial transaction a user may bring their cellular telephone in proximity to a point-of-sale terminal. When the user does this, financial information (such as information associated with the user's credit card) may be wirelessly communicated to the point-of-sale terminal.

In spite of the considerable effort already devoted to the development of technology in the area of wireless financial transactions and related areas, further improvements would be desirable.

SUMMARY

The described embodiments relate to a portable electronic device that includes: a processor, an antenna; an interface circuit that wirelessly communicates with another electronic device (e.g., using near-field communication); and a secure element that conducts a financial transaction with the other electronic device. During the financial transaction, the secure element receives a final command from the other electronic device, where the final command is specific to a payment applet stored in the secure element, and the payment applet executes in an environment of the secure element to conduct the financial transaction. Then, the secure element provides, to the other electronic device, a response to the final command. Moreover, the secure element generates a unique transaction identifier for the financial transaction based on financial-account information associated with the payment applet. Next, the secure element provides, to the processor, an end message for the financial transaction with the unique transaction identifier.

In some embodiments, prior to receiving the final command, the secure element: receives, from the other electronic device, information initiating the financial transaction; and provides, to the other electronic device, a response.

Moreover, prior to receiving the final command, the secure element may receive, from the processor, information specifying the payment applet to use during the financial transaction. This information may have been defined prior to a start of the financial transaction.

Furthermore, prior to receiving the final command, the secure element may provide to the processor a start message when the financial transaction starts. In addition, the secure element may determine that the other electronic device is faulty if the start message is provided without the financial transaction subsequently concluding.

In some embodiments, the communication with the other electronic device is via radio-frequency communication (such as near-field communication). Furthermore, the secure element may provide the start message to the processor when the financial transaction starts based on a strength of an electromagnetic field associated with the radio-frequency communication.

Note that the unique transaction identifier may correspond to a secure hash of the financial-account information.

Another embodiment provides the secure element with a memory that stores the payment applet.

Another embodiment provides a computer-program product for the payment applet for use in conjunction with the secure element in the portable electronic device. This computer-program product includes instructions for at least some of the operations performed by the portable electronic device.

Another embodiment provides a method for conducting the financial transaction with the other electronic device, which may be performed by the secure element in the portable electronic device. During the method, the portable electronic device may receive, from the other electronic device, the final command during the financial transaction, where the final command is specific to the payment applet stored in the secure element, and where, during the financial transaction, the payment applet is executed in the environment of the secure element and conducts the financial transaction with the other electronic device. Then the portable electronic device provides, to the other electronic device, the response to the final command. Moreover, the secure element generates the unique transaction identifier for the financial transaction based on the financial-account information associated with the payment applet. Next, the portable electronic device provides, to a processor in the portable electronic device, the end message for the financial transaction with the unique transaction identifier.

This Summary is provided merely for purposes of presenting some exemplary embodiments, so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

Table 1 provides a format for a start message in accordance with an embodiment of the present disclosure.

Table 2 provides track 1 and track 2 financial-account information that may be used to determine a unique transaction identifier in accordance with an embodiment of the present disclosure.

Table 3 provides a format for an end message in accordance with an embodiment of the present disclosure.

Table 4 provides a format for an informative field for coding an end event in accordance with an embodiment of the present disclosure.

Table 5 provides a format for the BER-TLV field in an end event in accordance with an embodiment of the present disclosure.

Figure 1:
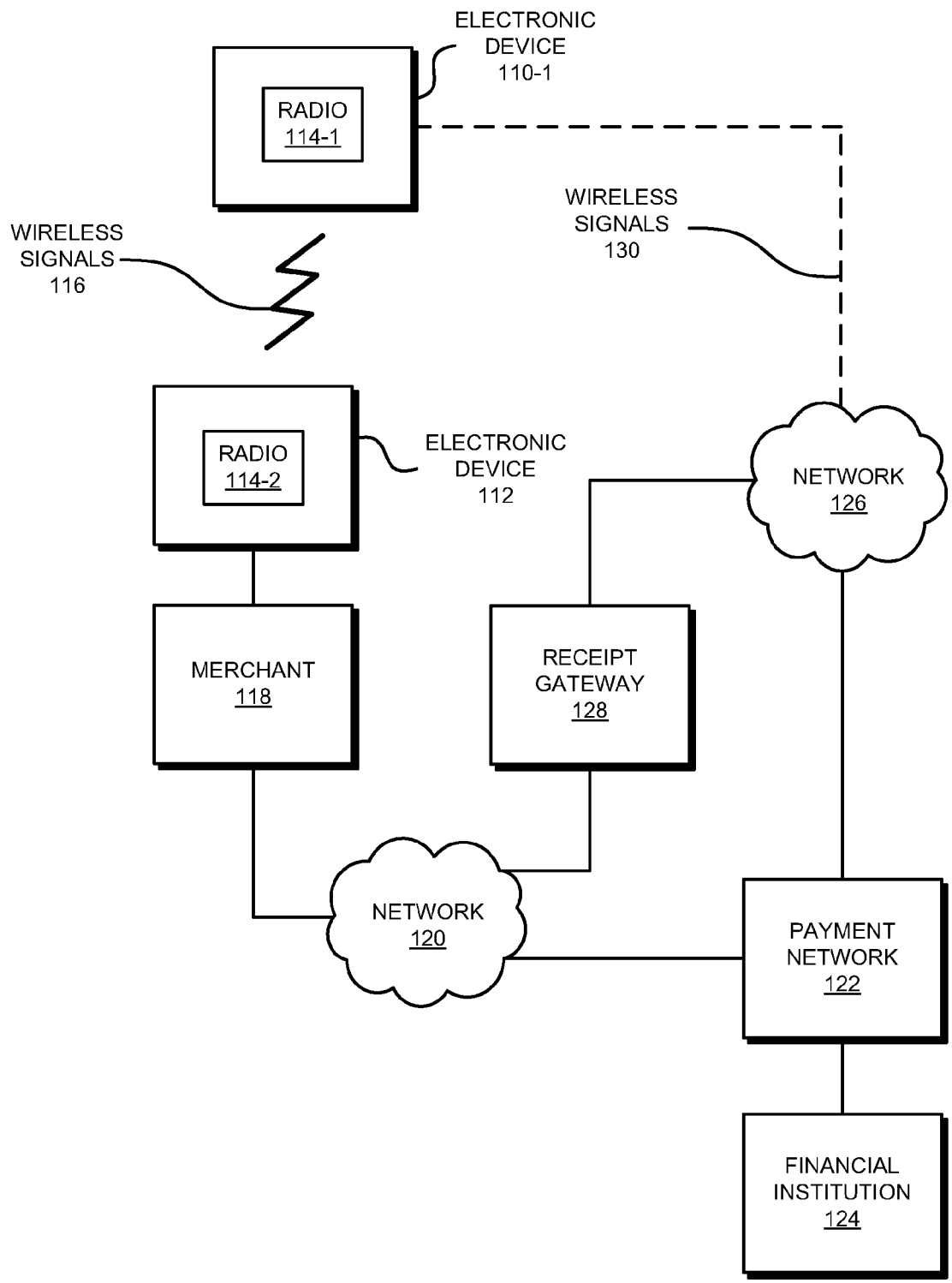
FIG. 1 is a block diagram illustrating electronic devices wirelessly communicating during a financial transaction in accordance with an embodiment of the present disclosure.

Table 6 provides first-level information that may be communicated to one of the electronic devices in FIG. 1 in accordance with an embodiment of the present disclosure.

Table 7 provides second-level information that may be communicated to one of the electronic devices in FIG. 1 in accordance with an embodiment of the present disclosure.

Note that like reference numerals refer to corresponding parts throughout the drawings. Moreover, multiple instances of the same part are designated by a common prefix separated from an instance number by a dash.

DETAILED DESCRIPTION

In order to facilitate conducting a financial transaction via wireless communication between a portable electronic device (such as a smartphone) and another electronic device (such as a point-of-sale terminal), the portable electronic device may, after a final command is received from the other electronic device, determine a unique transaction identifier for the financial transaction. In particular, the final command may be specific to a payment applet, stored in a secure element in the portable electronic device, which conducts the financial transaction. The secure element may generate the unique transaction identifier based on financial-account information associated with the payment applet, which is communicated to the other electronic device. Moreover, the financial-account information may specify a financial account that is used to pay for the financial transaction. Next, the secure element may provide, to a processor in the portable electronic device, an end message for the financial transaction with the unique transaction identifier.

Moreover, the unique transaction identifier may be capable of being independently computed by one or more other entities associated with the financial transaction (such as a counterparty in the financial transaction, which is associated with the other electronic device, or a payment network that processes payment for the financial transaction) based on the financial-account information communicated by the portable electronic device. The electronic device may associate receipt information, which is subsequently received from a third party (such as the payment network), with the financial transaction by comparing the determined unique transaction identifier to the computed unique transaction identifier.

For example, the financial transaction may be conducted between the portable electronic device and the other electronic device by conveying packets that are transmitted and received by radios in the portable electronic device and the other electronic device in accordance with a communication protocol, such as an Institute of Electrical and Electronics Engineers (IEEE) 802.11 standard, Bluetooth™ (from the Bluetooth Special Interest Group of Kirkland, Wash.), and/ or another type of wireless interface, such as a near-field-communication standard or specification (from the NFC Forum of Wakefield, Mass.). In the discussion that follows, near-field communication is used as an illustrative example.

The communication between the portable electronic device and the other electronic device is shown in FIG. 1, which presents a block diagram illustrating electronic devices 110-1 and 112 wirelessly communicating. In particular, these electronic devices may wirelessly communicate during a financial transaction. For example, the financial transaction may initiate when a user positions electronic device 110-1 (such as a cellular telephone) proximate to electronic device 112 (such as a point-of-sale terminal). Note that proximity may involve physical contact between electronic devices 110-1 and 112 (such as touching or tapping electronic device 110-1 on electronic device 112) or may be contactless (e.g., electronic device 110-1 may be within the radiation pattern of an antenna in electronic device 112, such as within a few inches to a foot). In particular, the financial transaction may initiate based on a strength of an electromagnetic field associated with the radio-frequency (and, more generally, wireless) communication exceeds a threshold (such as a received signal strength indication of greater than −50, −80 or −110 dBm). This wireless communication may use a radio-frequency-identification communication protocol (such as near-field communication). Thus, the wireless communication may or may not involve a connection being established between electronic devices 110-1 and 112, and therefore may or may not involve communication via a wireless network (such as a cellular-telephone network).

In response to detecting that electronic device 110-1 is proximate to electronic device 112, electronic devices 110-1 and 112 may perform an interaction during which a secure element in electronic device 110-1 (which is described further below with reference to FIGS. 2 and 4) may provide financial-account information to electronic device 112 via wireless communication. For example, a payment applet executing in the environment of the secure element (such as an operating system executed by a processor in the secure element) may conduct a financial transaction during which the financial-account information is provided. Conducting the financial transaction may involve providing a start message (such as a start transaction event or start event) to a processor in electronic device 110-1 to initiate a financial transaction. The information in the start message may indicate the status (such as 'ok' or 'error'), and may be used by the processor to subsequently determine if the financial transaction concluded successfully. Table 1 illustrates an embodiment of the format of the start message.

TABLE 1

| Parameter | Length | Value | Description |
| --- | --- | --- | --- |
| Type | 1 | '01' | Start event |
| Version | 1 | '01' | Version of the data structure |
| Status Word | 2 | Var | Status Word (SW1, SW2) for the SELECT command. '9000': SELECT successfully completed '6283': Blocked All other values: Command failure (other error conditions) |

Note that the financial-account information may be associated with the payment applet, and may correspond to a credit-card account (and, more generally, a financial vehicle associated with a financial account, such as a credit card or a debit card) that a user of electronic device 110-1 is using to provide payment for items or services being purchased during the financial transaction. Moreover, note that the payment applet that conducts the financial transaction may be specified in a variety of ways. In particular, electronic device 112 may provide information to electronic device 110-1 that specifies the payment applet, and the secure element may provide a response to electronic device 112. Alternatively, a user of electronic device 110-1 may have defined or specified the payment applet prior to the start of the financial transaction (i.e., the payment applet that conducts the financial transaction may be predefined or pre-specified by the user, e.g., using a digital wallet executed by a processor in electronic device 110-1).

The financial-account information may correspond to or be equivalent to magnetic-stripe data on a credit card. As shown in Table 2, in some embodiments the financial-account information includes so-called 'track 1' data and/or 'track 2' data, such as: a token associated with a financial-account identifier, a cardholder-name field, an expiration date of the financial account specified by the financial-account identifier, a numerical value corresponding to a number of financial transactions conducted by electronic device 110-1, a dynamic card verification value (DCVV) for the financial transaction, and/or additional data.

Because the wireless communication between electronic devices 110-1 and 112 may (in some instances) be communicated 'in the clear' (i.e., it may not be encrypted), the financial-account information may (in some instances) exclude explicit identifiers of the user to protect their privacy, and may dynamically or indirectly specify the financial account to prevent subsequent fraud or misuse of the financial-account information (such as if a malicious party intercepts the financial-account information during the wireless communication). For example, if the financial account is a credit-card account, the token may be a device primary account number (DPAN) instead of the financial primary account number (FPAN) or credit-card number, where the DPAN may be thought of as a 'virtual' credit card number that corresponds/maps to a 'real' FPAN. Similarly, the cardholder-name field may include information specifying a provider or manufacturer of electronic device 110-1 (e.g., Apple Inc., of Cupertino, Calif.) and a place holder for the user or the credit-cardholder's name, such as 'APL/VALUED CUSTOMER.' (However, outside of the United States, the cardholder's name may not be included with the financial-account information.) In addition, the financial-account information may include a truncated counter value (such as the least-significant three bits, four bits or five bits of a two-byte counter value) combined with the dynamic card verification value. Note that the dynamic card verification value may be dynamically generated by the secure element in electronic device 110-1 for each financial transaction using a cryptographic technique using the DPAN, the counter value, one or more cryptographic keys and a random number provided by electronic device 112 during the wireless communication. Consequently, a different dynamic card verification value may be generated for each financial transaction.

TABLE 2

| Track | Financial-Account Information |
| --- | --- |
| 1 | DPAN | Cardholder Name | Expiration Date | Counter + DCVV | Additional Data |
| 2 | DPAN | Expiration Date | Counter + DCVV | Additional Data |

Related to and/or as part of the performance of a financial transaction, the secure element in electronic device 110-1 may determine a unique transaction identifier for the financial transaction based on the financial-account information. In particular, after receiving a final message during the financial transaction from electronic device 112 (which is specific to the payment applet) and providing a response, the secure element may generate the unique transaction identifier based on the financial-account information. For example, the unique transaction identifier may be a secure hash of the financial-account information. Then, the secure element may provide an end message (such as an end transaction event or end event) to the processor in electronic device 110-1. As shown in Table 3, which provides an embodiment of the format of the end message, the end message may include status information (such as 'ok' or 'error'), additional information (shown in Tables 4 and 5), and/or the unique transaction identifier. (For example, in Table 4, the Issuer Contact Requested field may be set for an offline EMV transaction when the maximum number of offline transactions has been exceeded.) As noted previously, if the processor does not receive the end message after receiving the start message, the processor may determine that electronic device 112 is faulty.

TABLE 3

| Parameter | Length | Value | Description |
| --- | --- | --- | --- |
| Type | 1 | '02' | End event |
| Version | 1 | '01' | Version of the data structure |
| Status | 2 | Var | Command status word (SW1, SW2) |

TABLE 3-continued

| Parameter | Length | Value | Description |
|---|---|---|---|
| Word | | | '9000': Command successfully completed. All other values: Command failure (other error conditions) |
| Command | 2 | Var | Last command processed. CLA, INS bytes. |
| Transaction Identifier | 32 | Var | For MagStripe Transactions:<br>=16-LSB (SHA-256 (Track 1 Data)) \| 16-LSB (SHA-256 (Track 2 Data)) Where,<br>\| denotes concatenation<br>16-LSB denotes 16 least significant bytes<br>Track 1 Data is in ASCII format without Start Sentinel, End Sentinel and LRC, e.g.,<br>"B1234123412341234^APL/VALUED CUSTOMER^1512 . . . "<br>Track 2 Data is in BCD format without Start Sentinel, End Sentinel and LRC. If the length is odd, it is padded with a hex 'F' in the end.<br>e.g., hex '1234123412341234 = 1512 . . . <F>'<br>For EMV Transactions:<br>=SHA-256 (DPAN \| ATC \| Application Cryptogram) Where<br>\| denotes concatenation.<br>DPAN is the device primary account number<br>ATC is the counter value provided to the other electronic device<br>Application Cryptogram is a value provided to the other electronic device<br>This field would be filled with all '00's in case the status word is different than '9000'. |
| Transaction Status | 2 | Var | Status of the transaction:<br>Failures:<br>0100: Command Failed<br>Success:<br>0080: Sent Online for Approval<br>0040: Offline Approved<br>0000: Offline Declined<br>Other Values: reserved for future use |
| Informative | 2 | Var | This is a bitwise coded field with the various bits providing information about the financial transaction, as shown in Table 4 |
| TLV Objects | Var | 'E1' | Constructed tag including basic encoding rules-type length value (BER-TLV) encoded data, as shown in Table 5 |

TABLE 4

| Byte 1 (MSB) | | | | | | | | Byte 2 (LSB) | | | | | | | | Description |
|---|---|---|---|---|---|---|---|---|---|---|---|---|---|---|---|---|
| b8 | b7 | b6 | b5 | b4 | b3 | b2 | b1 | b8 | b7 | b6 | b5 | b4 | b3 | b2 | b1 | |
| 0 | 0 | 0 | 0 | 0 | 0 | 0 | 0 | 0 | 0 | 0 | 0 | 0 | 0 | 0 | 0 | No action required |
| — | — | — | — | — | — | — | — | — | — | — | — | — | — | — | 1 | CVM (PIN) required |
| — | — | — | — | — | — | — | — | — | — | — | — | — | — | 1 | — | Warning present (query payment applet) |
| — | — | — | — | — | — | — | — | — | — | — | — | — | 1 | — | — | Issuer contact requested (counter or thresholds exceeded) |
| — | — | — | — | — | — | — | — | — | — | — | — | 1 | — | — | — | PIN try limit exceeded |
| — | — | — | — | — | — | — | — | — | — | — | 1 | — | — | — | — | EMV Transaction ('0', if MagStripe transaction or if type of transaction cannot be determined) |
| 1 | — | — | — | — | — | — | — | — | — | — | — | — | — | — | — | Local action required (query payment applet) |
| All other values | | | | | | | | | | | | | | | | Reserved for future use |

TABLE 5

| Tag | Length | Description | Presence |
|---|---|---|---|
| 'E1' | Var | BER-TLV constructed tag Common Tags | Mandatory |
| '9F02' | 6 | Transaction Amount. Present if provided by the other electronic device. | Conditional |
| '5F2A' | 2 | Transaction Currency Code according to ISO 4217. Present if provided by the other electronic device. | Conditional |
| | | Scheme Specific Tags-Credit Card Type 1 | |
| '9F50' | Var (5-32) | CDI | Mandatory |
| '4F' | 7-16 | AID personalized. Present if informative byte 2, b3 = 1 | Conditional |
| 'CF' | 10 | MAID. Present if informative byte 2, b3 = 1 | Conditional |
| 'C1' | 2 | MSC (Mobile Sequence Counter). Present if Informative Byte 2, b3 = 1 | Conditional |
| | | Scheme Specific Tags-Credit Card Type 2 | |
| '9F10' | 7 | Issuer application data | Optional |
| '9F71' | 3 | Mobile CVM results | Optional |
| | | Scheme Specific Tags-Credit Card Type 3 | |
| 'DF51' | 17 | MCII (Mobile Cardholder Interaction Information) | Optional |

As described further below with reference to FIG. 5, this unique transaction identifier may be used by electronic device 110-1 to associate with the financial transaction receipt information (such as a status of the financial transactions and/or a digital receipt), which is received from a third party (such as a computer system operated for the third party) using a different communication channel than the wireless communication between electronic devices 110-1 and 112 (such as a connection in a wireless network, e.g., a cellular-telephone network or a Wi-Fi network). For example, the third party may be the provider of electronic device 110-1 and/or payment network 122 that processes payment for the financial transaction using the financial account specified by the financial-account information.

In particular, the unique transaction identifier may be capable of being independently computed by one or more other entities associated with the financial transaction based on the financial-account information communicated by electronic device 110-1. For example, the one or more other entities may include: a counterparty (such as merchant 118) in the financial transaction associated with electronic device 112; payment network 122; and/or a financial institution 124, such as a bank, associated with the financial account. Consequently, the unique transaction identifier may be computed by the third party without electronic device 110-1 communicating the determined unique transaction identifier to electronic device 112 or the third party.

Furthermore, the receipt information may include the computed unique transaction identifier, and electronic device 110-1 may associate the receipt information with the financial transaction by comparing the determined and the computed unique transaction identifiers. In this way, the user can receive information that indicates that the financial transaction was completed and/or an electronic or digital receipt without requiring the user to touch or bring electronic device 110-1 proximate to electronic device 112 one or more additional times, thereby significantly improving the user experience and encouraging the use of electronic device 110-1 when conducting financial transactions.

With this discussion in mind, after receiving the financial-account information, electronic device 112 (or merchant 118) may use the financial-account information to compute the unique transaction identifier. Then, merchant 118 may communicate via network 120 (such as a wired or wireless network) the financial-account information, as well as additional information associated with the financial transaction (such as an identifier of the counterparty and/or a financial amount of the financial transaction), to payment network 122 and/or financial institution 124 (such as an issuer of the credit card or financial vehicle being used to pay for the financial transaction). Note that, while we refer to entities such as 'merchant 118,' 'payment network 122,' and 'financial institution 124,' this is done for ease of description. What is meant by merchant 118, payment network 122, etc., is hardware (server computers and related networking equipment) under the control of and/or otherwise performing actions on behalf of such entities.

After receiving the financial-account information and the additional information, payment network 122 and/or financial institution 124 may complete the financial transaction. For example, after successful verification of the financial account and the counterparty, the financial account may be debited for the financial amount and the counterparty may be notified that payment is approved. In addition, payment network 122 and/or financial institution 124 may compute the unique transaction identifier based on the financial-account information. Alternatively, merchant 118 may provide the computed unique transaction identifier to payment network 122 and/or financial institution 124.

If the user of electronic device 110-1 has previously registered with payment network 122, payment network 122 may provide a notification to electronic device 110-1 via network 126 (such as a cellular-telephone network or a Wi-Fi network). This notification may indicate that there has been a change associated with the financial account. In response, electronic device 110-1 may request from payment network 122 information associated with the financial transaction (such as the receipt information). Next, payment network 122 may provide the requested information, which includes the computed unique transaction identifier for subsequent use in associating the information with the financial transaction. Note that the information may include so-called 'first-level' information, such as: a status of the financial transaction (e.g., the financial transaction is complete), the identifier for the counterparty in the financial transaction, and/or the financial amount of the financial transaction. Alternatively or additionally, the information may include second-level information (e.g., a digital receipt), such as: an itemized list of one or more purchased items, links (such as URLs) to information associated with products, advertising, discounts (such as coupons) for future purchases of at least one item, discounts for future purchases from the counterparty in the financial transaction, accounting information (which can be used to account for expenses, such as an expense report), and sales-tax and/or income-tax information (which can be used to determine an income-tax return). Tables 6 and 7 provide illustrations of information in the first-level information and the second-level information (some of which may be optional).

TABLE 6

| Key Name | Type | Description |
|---|---|---|
| Determined Transaction Identifier | String | A unique key that allows first-level and second-level receipt information to be consolidated |

TABLE 6-continued

| Key Name | Type | Description |
| --- | --- | --- |
| Transaction Value | Decimal | This is the total financial-transaction amount in the 'currency' specified by Currency |
| Currency | String | The currency of the transaction (such as an ISO 4217 currency code or the currency in a current location of the electronic device) |
| Transaction Date | String | Date and time of the financial transaction |
| Merchant Name | String | The name of the merchant |
| Merchant Category | String | Define what type of category the merchant falls into, such as a predefined set of codes for categorization (e.g., Grocery, Fuel, Dining, etc.) |
| Transaction Status | String | Tracks the authorization status of a financial transaction (e.g., pending, approved, declined) |

TABLE 7

| Key Name | Type | Description |
| --- | --- | --- |
| Computed Transaction Identifier | String | A unique key that allows the Merchant to reference a financial transaction |
| Product Identifiers | Array of Numbers | Identify products associated with the purchased products in the financial transaction |
| Pass-Type Identifiers | Array of Strings | Link other passes to the receipt for the purchased products in the financial transaction |
| Location | String | The location where the financial transaction occurred |
| Merchant Address | Array of Strings | Merchant-address information |
| Billing Address | Array of Strings | Billing-address information |
| Shipping Address | Array of Strings | Shipping-address information |
| Line Items | Array of Strings | Each item listed on the receipt |
| Summary | Array of Strings | Provides more context to the receipt (e.g., subtotal, service charge, reward points earned) |
| Tax Identifier | String | Identifies the Merchant in the specified tax system |
| Tax System | String | The tax system used in the financial transaction (e.g., US, VAT) |
| Total Tax | Decimal | The amount of tax taken from the purchase |
| Tax Itemization | Array of Strings | Includes the amount of tax on each product at a specified tax rate |
| Barcode | Barcode Dictionary | Allows Merchants to look up returned products |
| Logo Text | String | Text displayed next to a logo on the receipt |
| Date/Time Style | String | Style of displayed date/time |
| Header, Footer and Back Fields | Array of Strings | Fields to be displayed on the header, footer or back of the receipt |

In some embodiments, the second-level information is provided to electronic device 110-1 by a merchant payment gateway, such as a receipt gateway 128 associated with the provider. In particular, merchant 118 may provide the computed unique transaction identifier, a secure hash (such as SHA-256) of the DPAN, the first-level information and/or the second-level information to receipt gateway 128 via network 120. Then, if the user has previously registered electronic device 110-1 with receipt gateway 128 (e.g., using a registration process via network 126 and/or some other network), receipt gateway 128 may provide the notification to electronic device 110-1 via network 126. (In particular, receipt gateway 128 may: determine the DPAN from the secure hash of the DPAN; map from the DPAN to a secure-element identifier in electronic device 110-1 using a look-up table (which may have been set up when the DPAN was provisioned to the electronic device); map the secure-element identifier to a user identifier (such as an identifier of the user account with a provider of the electronic device) using the same or another look-up table; and may obtain a push token (such as an address associated with the electronic device, e.g., an IP address) based on the user identifier, so that receipt gateway 128 can provide the notification to electronic device 110-1.) In response, electronic device 110-1 may request from receipt gateway 128 the information associated with the financial transaction (such as the receipt information). Next, receipt gateway 128 may provide the requested information, which includes the computed unique transaction identifier for subsequent use in associating the information with the financial transaction.

The wireless communication between electronic devices 110-1 and 112 may involve the exchange of packets that include the financial-account information, as well as messages (such as the start message and/or the end message). These packets may be included in frames in one or more wireless channels.

As described further below with reference to FIGS. 2 and 4, electronic devices 110-1 and 112 may include subsystems, such as: a networking subsystem, a memory subsystem, a processing subsystem and a secure subsystem. In addition, electronic devices 110-1 and 112 may include radios 114 in the networking subsystems. More generally, electronic devices 110-1 and 112 can include (or can be included within) any electronic devices with networking subsystems that enable electronic devices 110-1 and 112 to wirelessly communicate with another electronic device. This can comprise transmitting frames on wireless channels to enable electronic devices to make initial contact, followed by exchanging subsequent data/management frames (such as connect requests to establish a connection), configuring security options (e.g., IPsec), transmitting and receiving packets or frames, etc.

As can be seen in FIG. 1, wireless signals 116 (represented by a jagged line) are transmitted from a radio 114-1 in electronic device 110-1. These wireless signals 116 are received by radio 114-2 in electronic device 112. (Note that the communication via network 126 may involve wireless signals 130. However, these wireless signals may involve a different communication protocol than wireless signals 116.)

In the described embodiments, processing a packet or frame in either of electronic devices 110-1 and 112 includes: receiving wireless signals 116 with the packet or frame; decoding/extracting the packet or frame from received wireless signals 116 to acquire the packet or frame; and processing the packet or frame to determine information contained in the packet or frame (such as the financial-account information).

Although we describe the environment shown in FIG. 1 as an example, in alternative embodiments, different numbers or types of electronic devices may be present. For example, some embodiments comprise more or fewer electronic devices. As another example, in another embodiment, different electronic devices are transmitting and/or receiving packets or frames.

We now describe embodiments of the electronic device. FIG. 2 presents a block diagram illustrating electronic device 110-1. This electronic device includes processing subsystem 210, memory subsystem 212, networking subsystem 214, authentication subsystem 216 and secure subsystem 218. Processing subsystem 210 includes one or more devices configured to perform computational operations. For example, processing subsystem 210 can include one or more microprocessors, application-specific integrated circuits (ASICs), microcontrollers, programmable-logic devices, and/or one or more digital signal processors (DSPs).

In addition, processing subsystem 210 may include a secure enclave processor 220 (which is a system-on-chip within one or more processors in processing subsystem 210) that performs security services for other components in the processing subsystem 210 and that securely communicates with other subsystems in electronic device 110-1. Secure enclave processor 220 may include one or more processors, a secure boot ROM, one or more security peripherals, and/or other components. The security peripherals may be hardware-configured to assist in the secure services performed by secure enclave processor 220. For example, the security peripherals may include: authentication hardware implementing various authentication techniques, encryption hardware configured to perform encryption, secure-interface controllers configured to communicate over the secure interface to other components, and/or other components. In some embodiments, instructions executable by secure enclave processor 220 are stored in a trust zone in memory subsystem 212 that is assigned to secure enclave processor 220, and secure enclave processor 220 fetches the instructions from the trust zone for execution. Secure enclave processor 220 may be isolated from the rest of processing subsystem 210 except for a carefully controlled interface, thus forming a secure enclave for secure enclave processor 220 and its components. Because the interface to secure enclave processor 220 is carefully controlled, direct access to components within secure enclave processor 220 (such as a processor or a secure boot ROM) may be prevented. In some embodiments, secure enclave processor 220 encrypts and/or decrypts authentication information communicated with authentication subsystem 216, and encrypts and/or decrypts information (such as tokens) communicated with secure subsystem 218. Furthermore, secure enclave processor 220 may compare authentication information with the stored-authentication information and, if a match is obtained, may provide an encrypted token with an authentication-complete indicator to a secure element 230.

Memory subsystem 212 includes one or more devices for storing data and/or instructions for processing subsystem 210, networking subsystem 214, authentication subsystem 216 and/or secure subsystem 218. For example, memory subsystem 212 can include dynamic random access memory (DRAM), static random access memory (SRAM), and/or other types of memory. In some embodiments, instructions for processing subsystem 210 in memory subsystem 212 include: one or more program modules or sets of instructions (such as program module 246, e.g., a digital wallet, a passbook and/or a mobile payments application), which may be executed by processing subsystem 210. Note that the one or more computer programs may constitute a computer-program mechanism. Moreover, instructions in the various modules in memory subsystem 212 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 210.

In addition, memory subsystem 212 can include mechanisms for controlling access to the memory. In some embodiments, memory subsystem 212 includes a memory hierarchy that comprises one or more caches coupled to a memory in electronic device 110-1. In some of these embodiments, one or more of the caches is located in processing subsystem 210.

In some embodiments, memory subsystem 212 is coupled to one or more high-capacity mass-storage devices (not shown). For example, memory subsystem 212 can be coupled to a magnetic or optical drive, a solid-state drive, or another type of mass-storage device. In these embodiments, memory subsystem 212 can be used by electronic device 110-1 as fast-access storage for often-used data, while the mass-storage device is used to store less frequently used data.

Networking subsystem 214 includes one or more devices configured to couple to and communicate on a wired and/or wireless network (i.e., to perform network operations), including an interface circuit 222 (such as a near-field-communication circuit) and an antenna 224. For example, networking subsystem 214 can include a Bluetooth™ networking system, a cellular networking system (e.g., a 3G/4G network such as UMTS, LTE, etc.), a universal serial bus (USB) networking system, a networking system based on the standards described in IEEE 802.11 (e.g., a Wi-Fi networking system), an Ethernet networking system, and/or another communication system (such as a near-field-communication system).

Networking subsystem 214 includes processors, controllers, radios/antennas, sockets/plugs, and/or other devices used for coupling to, communicating on, and handling data and events for each supported networking or communication system. Note that mechanisms used for coupling to, communicating on, and handling data and events on the network for each network system are sometimes collectively referred to as a 'network interface' for the network system. Moreover, in some embodiments a 'network' between the electronic devices does not yet exist. Therefore, electronic device 110-1 may use the mechanisms in networking subsystem 214 for performing simple wireless communication between electronic devices 110-1 and 112 (FIG. 1), e.g., transmitting advertising frames and/or near-field communication as described previously.

Authentication subsystem 216 may include one or more processors, controllers and devices for receiving the authentication information from a user of electronic device 110-1, and for securely communicating this authentication information to processing subsystem 210 (such as by encrypting the authentication information). For example, the authentication information may include: a biometric identifier acquired by a biometric sensor 226 (such as: a fingerprint sensor, a retinal sensor, a palm sensor, a signature-identification sensor, etc.); a personal identification number (PIN) associated with one of payment applets 236 that is received using a user-interface device 228 (such as a keypad, a touch-sensitive display, optical character recognition and/or voice recognition); and a passcode for unlocking at least some functionality of electronic device 110-1 that is received using user-interface device 228.

Furthermore, secure subsystem 218 may include a secure element 230, which includes one or more processors and memory. Note that secure element 230 may be a tamper-resistant component that is used in electronic device 110-1 to provide the security, confidentiality, and multiple application environments required to support various business models. Secure element 230 may exist in one or more of a variety of form factors, such as: a universal integrated circuit card (UICC), an embedded secure element (on a circuit board in electronic device 110-1), a smart secure digital (SD) card, a smart microSD card, etc.

Moreover, secure element 230 may include one or more applets or applications that execute in an environment of secure element 230 (such as in the operating system of secure element 230, and/or in a Java runtime environment executing on the secure element 230). For example, the one or more applets may include an authentication applet 232 that: performs contactless registry services, encrypts/decrypts packets or tokens communicated with secure enclave processor 220, sets one or more software flags (such as an authentication-complete flag 234) in an operating system of secure element 230, and/or conveys information to one or more payment applets 236 via sharable interface objects. (While a sharable interface object is used as an illustrative example in the present discussion, in other embodiments different mechanisms may be used, such as global services, remote method invocation (RMI), etc.) In addition, the one or more applets may include one or more payment applets 236 that conduct financial transactions with electronic device 112 (FIG. 1) when they are activated by program module 246 or passbook 248 and based on the one or more software flags, and/or when electronic device 110-1 is proximate to electronic device 112 in FIG. 1 (e.g., based on information received, via networking subsystem 214, from electronic device 112 in FIG. 1). While not shown in FIG. 2, secure element 230 may include an applet that generates unique transaction identifiers based on financial-account information.

Authentication applet 232 may execute in a master or issuer security domain in secure element 230, while payment applets 236 may execute in supplemental security domains. Communication between these security domains may be encrypted using different encryption/decryption keys that are security-domain specific. In electronic device 110-1 and/or during communication between electronic devices 110-1 and 112 (FIG. 1), encryption/decryption may involve symmetric and/or asymmetric encryption. In addition, the information communicated may also include a digital signature that is specific to electronic device 110-1 and/or components in electronic device 110-1.

Figure 3:
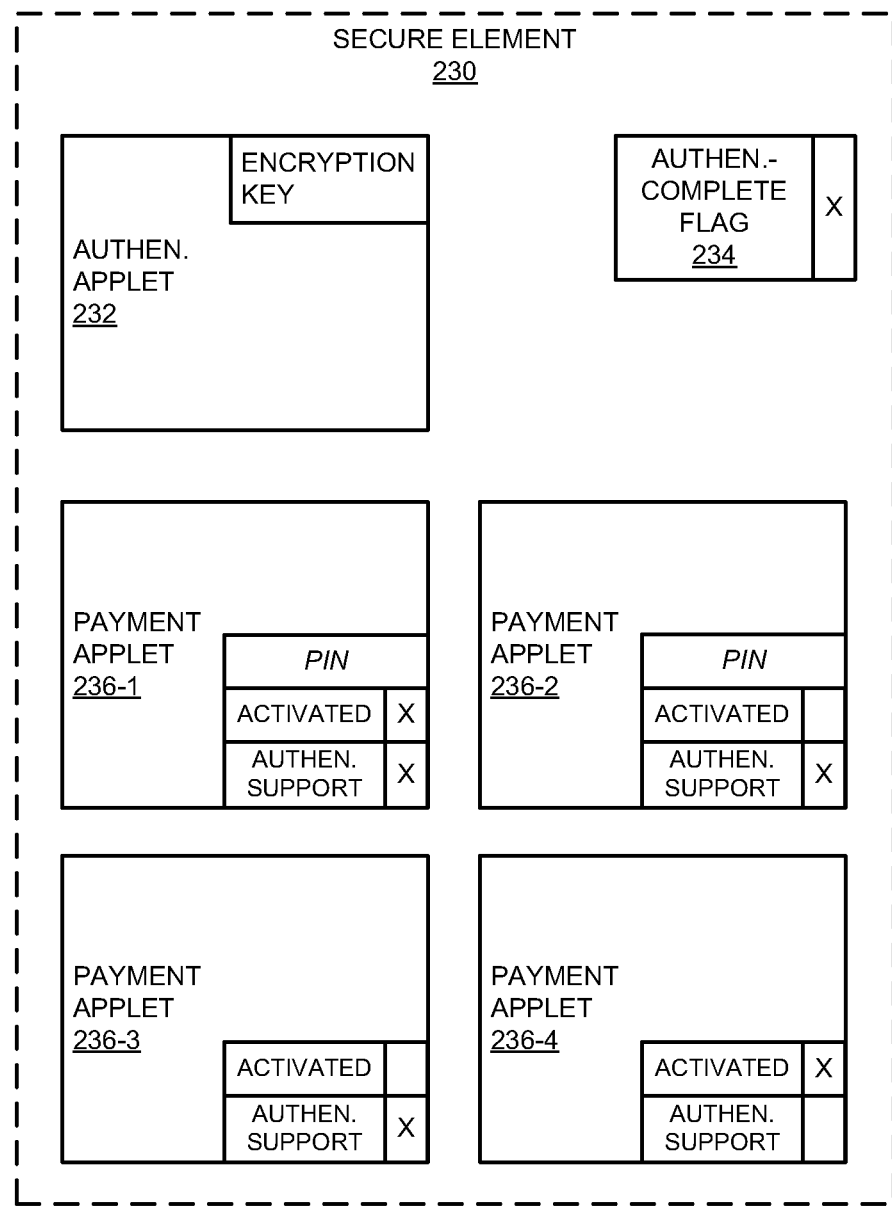
FIG. 3 is a block diagram illustrating the secure element in the electronic device in FIG. 2 in accordance with an embodiment of the present disclosure.

The data stored in secure element 230 is further illustrated in FIG. 3. In particular, for each of payment applets 236, secure element 230 may store: whether a given payment applet is active (in response to an activation command); and whether or not authentication-complete flag 234 is supported by/applies to the given payment applet. In some embodiments there are one or more payment applets (such as payment applet 236-4) for which authentication-complete flag 234 does not apply. For example, a payment applet may include a mass-transit payment applet that does not require authentication before it can be used to conduct a financial transaction. In some embodiments, secure element 230 stores, for at least one of payment applets 236, a PIN (such as a debit-card number) that is associated with this payment applet. For example, as shown in FIG. 3, payment applets 236-1 and 236-2 may store associated PINs. Additionally, one or more of the payment applets may store associated financial-account information.

During operation of electronic device 110-1, the user may use passbook 248 and/or secure element 230, as well as interface circuit 222 and antenna 224, to register electronic device 110-1 with one or more third parties to receive notifications associated with the financial account and/or the financial transaction. For example, passbook 248 and/or secure element 230 may provide an authentication token to the one or more third parties. The registration may include an identifier of a user of electronic device 110-1 (such as a secure hash of a user identifier), so that the notifications are only for those financial transactions conducted using electronic device 110-1. In an exemplary embodiment, the primary cardholder for a credit card allows a relative, such as the user, to also use the credit card to conduct financial transactions. In this case, the financial-account information that specifies the credit card may be provided by different electronic devices at different times for different financial transactions. However, electronic device 110-1 may only receive notifications for the financial transactions conducted using electronic device 110-1.

Alternatively, the registration may include the identifier of a user of electronic device 110-1, so that the notifications are for financial transactions associated with a financial account specified by the financial-account information, and the financial transactions may include those conducted using electronic device 110-1 and some financial transactions conducted using one or more other electronic devices. For example, the user may be the primary cardholder, and they may receive notifications when they conduct a financial transaction using electronic device 110-1, as well as when one or more relatives conduct financial transactions using the one or more other electronic devices.

The user may also use passbook 248 to select or activate one or more of payment applets 236 (such as payment applets 236-1 and 236-4). If payment applet 236-1 supports authentication-complete flag 234 (as indicated by the enabling or setting of authentication support in payment applet 236-1), in order for payment applet 236-1 to conduct a financial transaction with electronic device 112 (FIG. 1), payment applet 236-1 may need to be activated and authentication-complete flag 234 may need to be set or enabled in secure element 230 (indicating that the user has been authenticated). In contrast, for payment applet 236-4, which does not support authentication-complete flag 234 (as indicated by disabling of authentication support in payment applet 236-4), a financial transaction may be conducted when payment applet 236-4 is active (i.e., operation of payment applet 236-4 is not gated by the setting or enabling of authentication-complete flag 234 in secure element 230). While the present discussion illustrates the use of a global authentication-complete flag 234, note that in some embodiments there are separate authentication-complete flags associated with at least some of the payment applets 236 (i.e., there may be a specific authentication-complete flag for payment applet 236-1, etc.).

As described below, when interface circuit 222 indicates that electronic device 110-1 is proximate to electronic device 112 (FIG. 1), one of the activated and/or authenticated payment applets 236 (such as payment applet 236-1) may conduct a financial transaction and provide the associated financial-account information to interface circuit 222. For example, interface circuit 222 may determine proximity based on a strength of an electromagnetic field associated with the radio-frequency communication. Note that interface circuit 222 may receive the information (such as an activation command) from electronic device 112 (FIG. 1) that specifies one of payment applets 236 (such as payment applet 236-1), and electronic device 110-1 may provide a response to electronic device 112 (FIG. 1) via interface circuit 222 and antenna 224. Alternatively, as described previously, prior to the start of the financial transaction, the user may use passbook 248 (or another program module executed by processing subsystem 210) to select one of payment applets 236.

Then, payment applet 236-1 (which is used as an illustrative example) conducts the financial transaction with electronic device 112 (FIG. 1). This may involve providing a start message to processing subsystem 210 when the financial transaction starts. Moreover, payment applet 236-1 may instruct interface circuit 222 to communicate the financial-account information to electronic device 112 (FIG. 1) using antenna 224. As described further below with reference to FIGS. 5-7, during the financial transaction interface circuit 222 may receive a final command that is associated with payment applet 236-1. Next, payment applet 236-1 may instruct interface circuit 222 to communicate a response to the final command to electronic device 112 (FIG. 1) using antenna 224.

Furthermore, after receiving the final command, payment applet 236-1 and/or secure element 230 may determine the unique transaction identifier based on the financial-account information. For example, payment applet 236-1 and/or secure element 230 may perform a secure hash on the financial-account information (such as SHA-256), and may use a portion (such as the least-significant 16 bytes) as the unique transaction identifier. Additionally, payment applet 236-1 and/or secure element 230 may communicate an end message for the financial transaction (which includes the unique transaction identifier) to processing subsystem 210. This communication may occur via secure enclave processor 220.

Note that, if the start message is provided and the financial transaction subsequently does not conclude successfully (i.e., the end message is not sent), secure element 230 and/or processing subsystem 210 may determine that electronic device 112 (FIG. 1) is faulty. This information may be communicated, via networking subsystem 214, to one or more third parties (such as merchant 118 and/or payment network 122 in FIG. 1) so that faulty point-of-sale terminals can be identified and repaired.

Because the counter value in the financial-account information may be truncated, it is possible that different counts may appear to be the same in the financial-account information. For example, if the counter value is truncated to the least-significant three bits, counter values of 999 and 1,999 may appear to be the same. To assist in eventual disambiguation of the computed unique transaction identifier for the financial transaction (which may be subsequently received from the third party using interface circuit 222 and antenna 224) with another determined unique transaction identifier for another financial transaction, passbook 248 may prepend or append a timestamp when the financial-account information was communicated to electronic device 112 (FIG. 1) to the unique transaction identifier. (More generally, the timestamp may be associated with when the financial transaction occurred.) The modified unique transaction identifier may be securely communicated to secure element 230 and/or payment applet 236-1.

If the user and/or electronic device 110-1 are registered to receive notifications, electronic device 110-1 may receive a notification for a financial transaction from one or more third parties using interface circuit 222 and antenna 224. In response, secure element 230 and/or payment applet 236-1 may request the information associated with the financial transaction (such as the receipt information) and, via interface circuit 222 and antenna 224, may receive the information from the third party. This information may include the first-level information and/or the second-level information, as well as the computed unique transaction identifier. Secure element 230 and/or payment applet 236-1 may compare the determined unique transaction identifier and the computed unique transaction identifier. If a match is obtained, secure element 230 and/or payment applet 236-1 may associate the information received from the third party with the financial transaction. This information (such as the digital receipt) may be presented to the user, for example, using a display in display subsystem 240.

In some embodiments, the notification and the information are processed, at least in part, by passbook 248 executing on processing subsystem 210 instead of, or in conjunction with, secure element 230 and/or payment applet 236-1. For example, passbook 248 may request the information associated with the financial transaction in response to the notification. In addition, passbook 248 may compare the determined unique transaction identifier and the computed unique transaction identifier. If a match is obtained, passbook 248 may associate the information received from the third party with the financial transaction, and passbook 248 may present the information to the user.

Within electronic device 110-1, processing subsystem 210, memory subsystem 212, networking subsystem 214, authentication subsystem 216 and secure subsystem 218 may be coupled together using one or more interconnects, such as bus 238. These interconnects may include an electrical, optical, and/or electro-optical connection that the subsystems can use to communicate commands and data among one another. Note that different embodiments can include a different number or configuration of electrical, optical, and/or electro-optical connections among the subsystems. In some embodiments, electronic device 110-1 can detect tampering with secure components (such as secure enclave processor 220, secure element 230 and/or bus 238) and may destroy encryption/decryption keys or authentication information (such as a stored biometric identifier) if tampering is detected.

In some embodiments, the electronic device includes a display subsystem 240 for displaying information on a display, which may include a display driver and the display, such as a liquid-crystal display, a multi-touch touchscreen, etc. In addition, in some embodiments the electronic device includes a secure input/output (I/O) subsystem 242 (such as a keypad) for receiving the PIN of the user that is associated with one of payment applets 236. As noted previously, display subsystem 240 and/or secure I/O subsystem 242 may be included in authentication subsystem 216.

Electronic device 110-1 can be (or can be included in) any electronic device with at least one network interface. For example, electronic device 110-1 can be (or can be included in): a desktop computer, a laptop computer, a server, a media player (such as an MP3 player), an appliance, a subnotebook/netbook, a tablet computer, a smartphone, a cellular telephone, a piece of testing equipment, a network appliance, a set-top box, a personal digital assistant (PDA), a toy, a controller, a digital signal processor, a game console, a computational engine within an appliance, a consumer-electronic device, a portable computing device, a personal organizer, and/or another electronic device.

Although specific components are used to describe electronic device 110-1, in alternative embodiments, different components and/or subsystems may be present in electronic device 110-1. For example, electronic device 110-1 may include one or more additional processing subsystems, memory subsystems, networking subsystems, authentication subsystems, secure subsystems, display subsystems and/or secure I/O subsystems. Additionally, one or more of the subsystems may not be present in electronic device 110-1. Moreover, in some embodiments, electronic device 110-1 may include one or more additional subsystems that are not shown in FIG. 2. For example, electronic device 110-1 can include, but is not limited to, a data collection subsystem, an audio and/or video subsystem, an alarm subsystem, and/or a media processing subsystem. Also, although separate subsystems are shown in FIG. 2, in some embodiments, some or all of a given subsystem or component can be integrated into one or more of the other subsystems or components in electronic device 110-1. For example, in some embodiments program module 246 is included in operating system 244. Alternatively or additionally, at least some of the functionality of program module 246 may be included in passbook 248.

Moreover, the circuits and components in electronic device 110-1 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit may implement some or all of the functionality of networking subsystem 214 (such as a radio) and, more generally, some or all of the functionality of electronic device 110-1. Moreover, the integrated circuit may include hardware and/or software mechanisms that are used for transmitting wireless signals from electronic device 110-1 to, and receiving signals at electronic device 110-1 from, electronic device 112 (FIG. 1). Aside from the mechanisms herein described, radios are generally known in the art and hence are not described in detail. In general, networking subsystem 214 and/or the integrated circuit can include any number of radios. Note that the radios in multiple-radio embodiments function in a similar way to the radios described in single-radio embodiments.

In some embodiments, networking subsystem 214 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals, e.g., determining if the received signal comprises an advertising frame, etc.)

While a communication protocol compatible with a near-field communication standard or specification was used as an illustrative example, the described embodiments of the financial-transaction techniques may be used in a variety of network or communication interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both.

Figure 2:
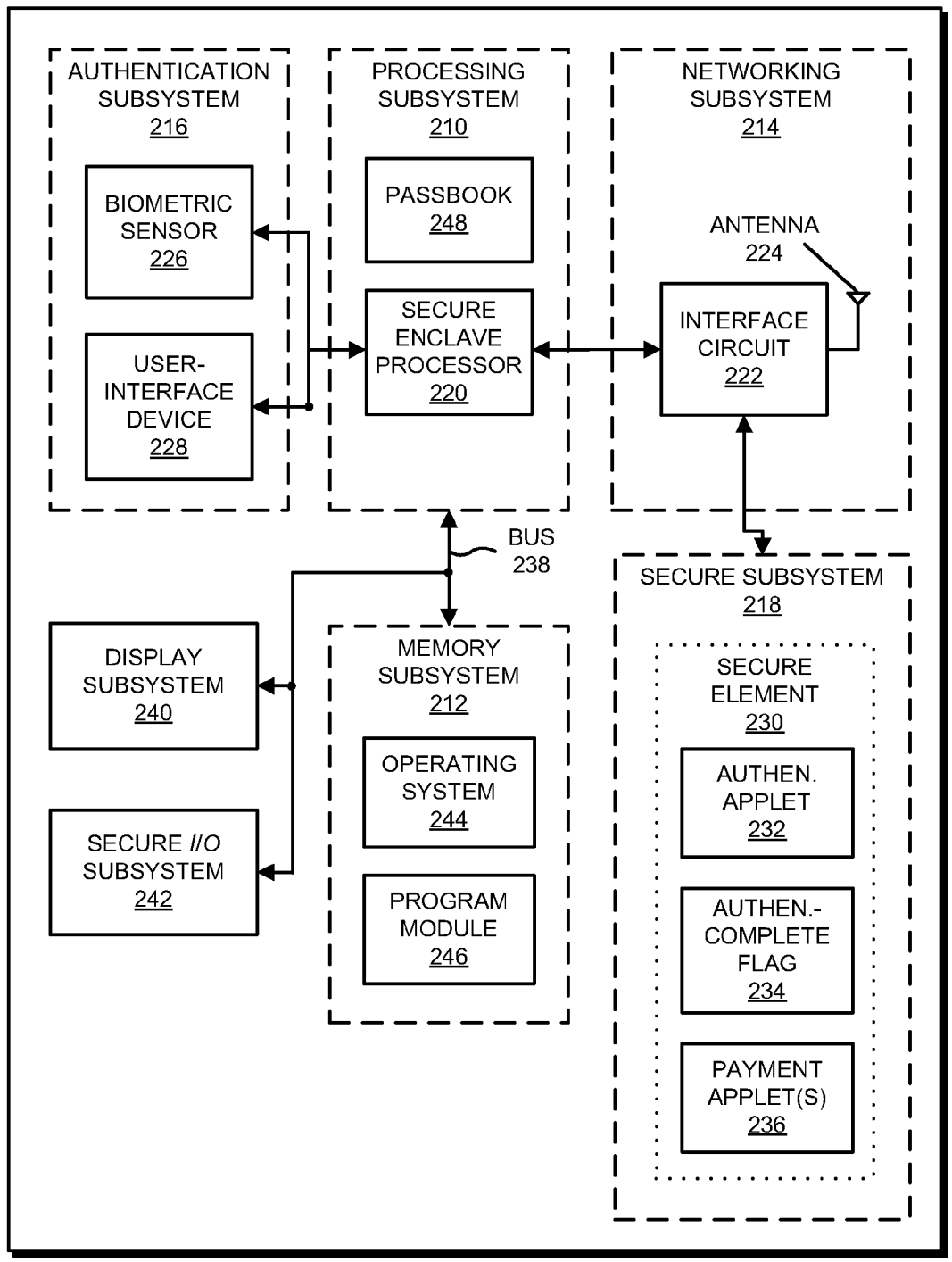
FIG. 2 is a block diagram illustrating one of the electronic devices of FIG. 1 in accordance with an embodiment of the present disclosure.
Figure 4:
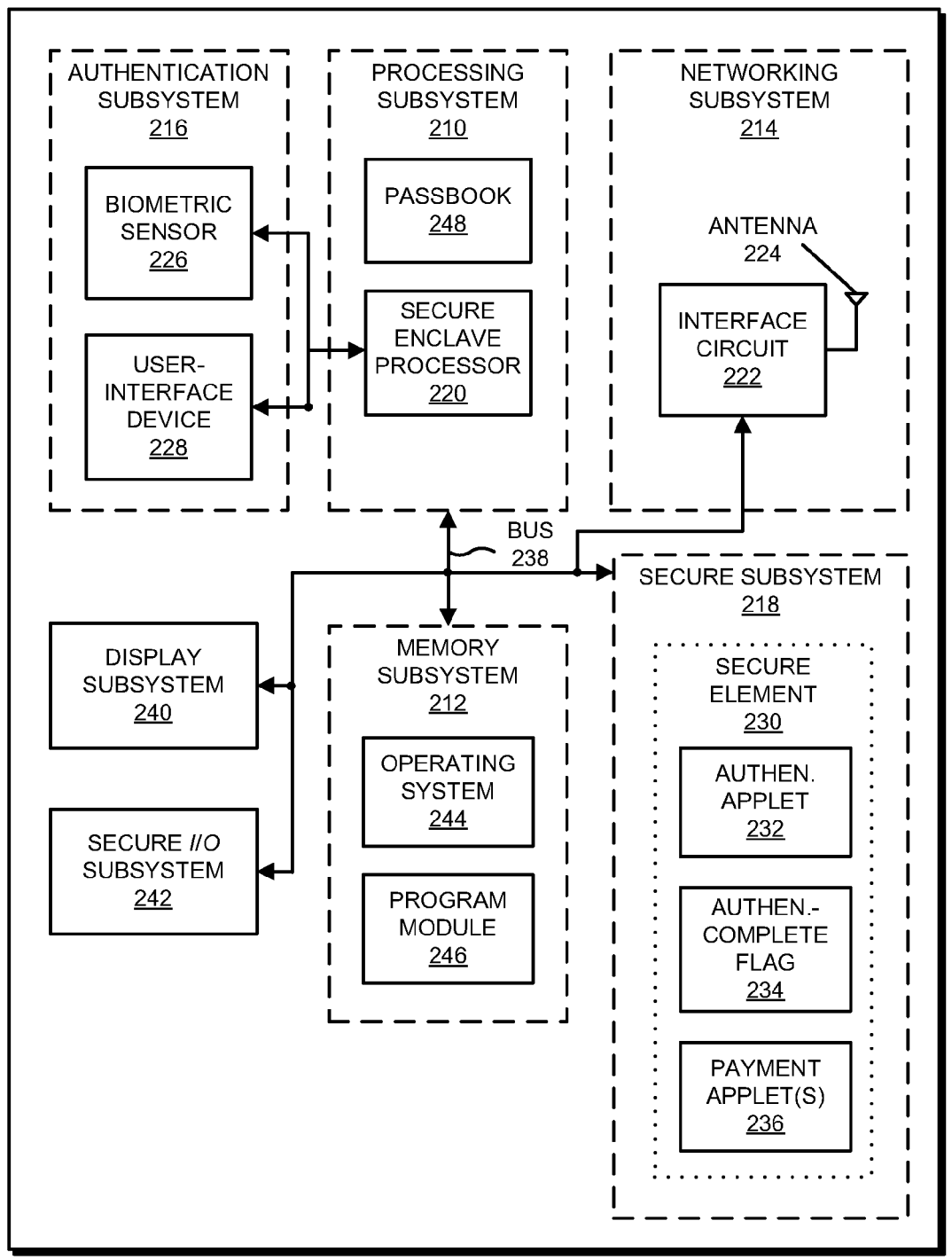
FIG. 4 is a block diagram illustrating one of the electronic devices of FIG. 1 in accordance with an embodiment of the present disclosure.

Moreover, while the preceding embodiments illustrated electronic device 110-1 with coupling (such as a link) between secure enclave processor 220 and interface circuit 222 in FIGS. 2 and 4, in other embodiments coupling between these components is via bus 238. This is illustrated in FIG. 4, which presents a block diagram of electronic device 110-1.

Furthermore, while the preceding discussion focused on the hardware, software and functionality in electronic device 110-1, merchant 118 (FIG. 1), payment network 122 (FIG. 1), and/or receipt gateway 128 (FIG. 1) may have the same or similar hardware (processors, memory, networking interfaces, etc.) and/or software to support the operations performed by these entities. In particular, these entities may include one or more computer systems with a processing subsystem that executes one or more program modules stored in a memory subsystem to perform the operations, and one or more networking interfaces for communicating with other electronic devices, such as electronic device 110-1.

We now describe embodiments of the financial-transaction technique. FIG. 5 presents a flow diagram illustrating a method 500 for conducting a financial transaction, which may be performed by an electronic device (such as electronic device 110-1 in FIGS. 1, 2 and 4). During operation, an interface circuit in the electronic device optionally receives information initiating the financial transaction (operation 510) from another electronic device (such as electronic device 112 in FIG. 1). For example, the information may be received when the electronic device and the other electronic device are proximate to each other.

Then, the information may be forwarded to a secure element in the electronic device. In response, an activated or selected payment applet in the secure element optionally provides a response (operation 512) to the other electronic device via the interface circuit, and the secure element communicates a start message (operation 514) to a processor subsystem (such as a host processor) in the electronic device. Note that the communication with the processor subsystem may occur via a secure enclave processor.

Next, the payment applet conducts the financial transaction. This may involve providing financial-account information (operation 516), which is associated with the payment applet, via the interface circuit to the other electronic device. Moreover, the payment applet may receive a final command (operation 518) during the financial transaction from the other electronic device via the interface circuit, where the final command is specific to the payment applet. In addition, the payment applet may provide an optional response (operation 520) to the final command to the other electronic device via the interface circuit.

Furthermore, the secure element (such as the payment applet or another applet in the secure element) may determine a unique transaction identifier (operation 522) based on the financial-account information. For example, secure element 230 (FIGS. 2 and 4) may perform a SHA-256 secure hash on the track 1 data and/or the track 2 data. The least-significant 16 bytes of the 32-byte outputs of the SHA-256 secure hash for the track 1 data and the track 2 data may be concatenated as the unique transaction identifier. Note that in embodiments where the track 1 data or the track 2 data is unavailable, the corresponding 16 bytes in the unique transaction identifier may be all zeros.

Subsequently, the payment applet may communicate an end message (operation 524) to the processor subsystem. This end message may (or may not) include the unique transaction identifier.

Additionally, the electronic device may perform one or more additional operations (operation 526). For example, processing subsystem 210 (FIGS. 2 and 4) and/or secure element 230 (FIGS. 2 and 4) may: receive the notification from the third party; request the information associated with the financial transaction; receive the information (which includes the computed unique transaction identifier); compare the determined unique transaction identifier and the computed unique transaction identifier; and/or associate the received information with the financial transaction if a match is obtained. In an exemplary embodiment, a match is obtained if either the portion of the unique transaction identifiers associated with the track 1 data or the portion of the unique transaction identifiers associated with the track 2 data matches.

Figure 5:
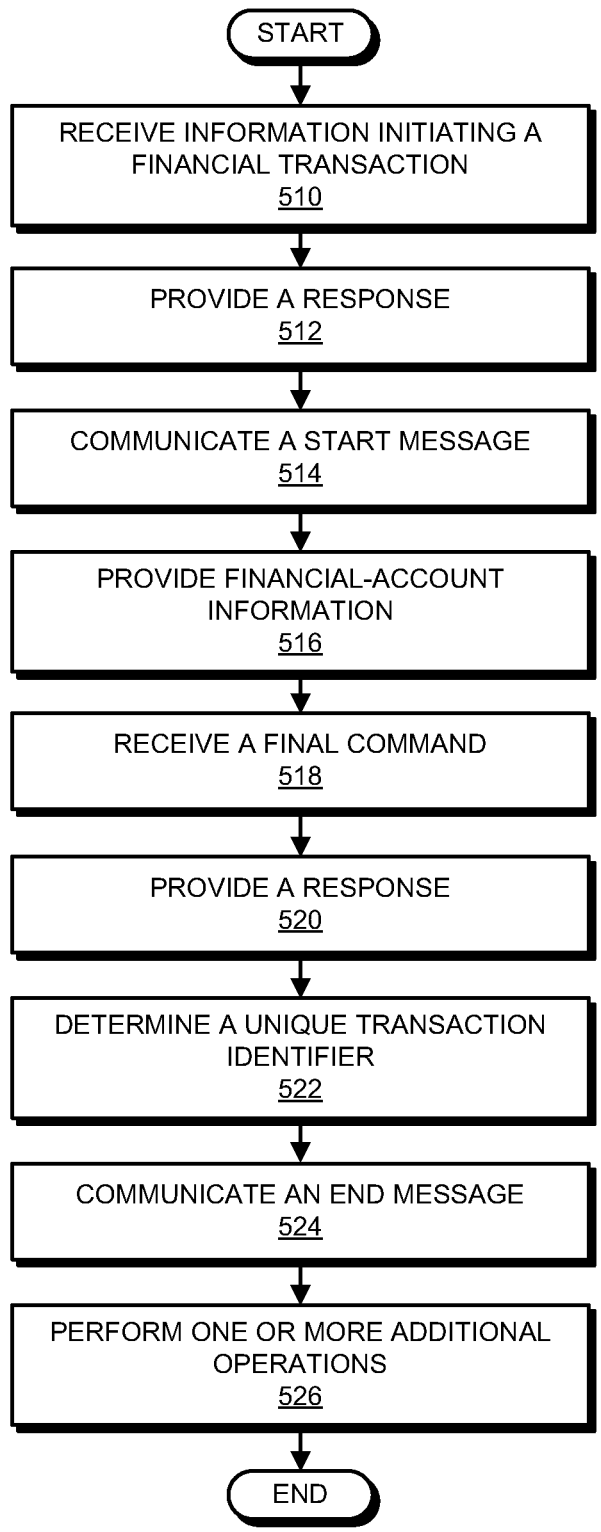
FIG. 5 is a flow diagram illustrating a method for conducting a financial transaction using one of the electronic devices in FIG. 1 in accordance with an embodiment of the present disclosure.
Figure 6:
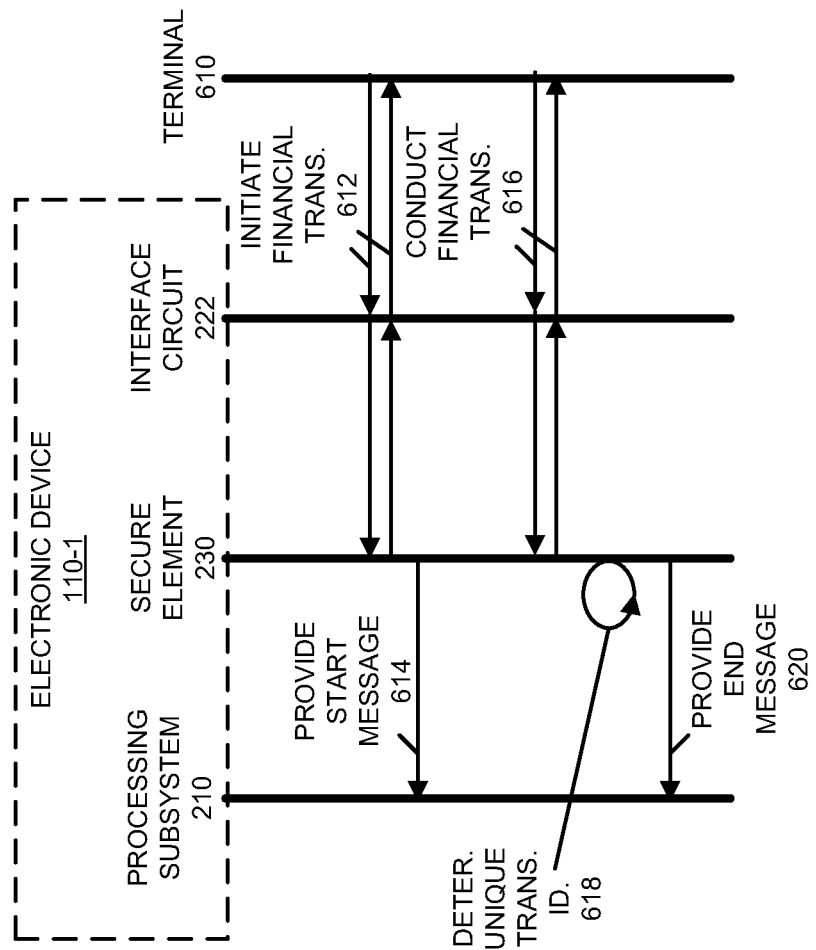
FIG. 6 is a drawing illustrating communication between the electronic devices of FIG. 1 in accordance with an embodiment of the present disclosure.

We now describe FIG. 6, which presents a drawing illustrating communication within electronic device 110-1 (FIG. 1) and between electronic devices 110-1 and 112 (FIG. 1), and which provides further information regarding the aforementioned financial-transaction technique of FIG. 5. In particular, terminal 610 (such as electronic device 112 in FIG. 1) may initiate 612 a financial transaction with secure element 230 via interface circuit 222 in electronic device 110-1. In response, secure element 230 (and, in particular, a payment applet in secure element 230) may respond to terminal 610 via interface circuit 222. In addition, secure element 230 may provide a start message 614 to processing subsystem 210 (such as a host processor in electronic device 110-1).

Subsequently, secure element 230 (and, in particular, the payment applet in secure element 230) and terminal 610 may conduct financial transaction 616 via interface circuit 222. Conducting financial transaction 616 may involve a final command being received by the payment applet in secure element 230. In response, secure element 230 (such as the payment applet or another applet in secure element 230) may generate or determine the unique transaction identifier 618. Then, secure element 230 communicates an end message 620 (which may include the unique transaction identifier) to processing subsystem 210. This communication may occur via a secure enclave processor in processing subsystem 210.

Figure 7:
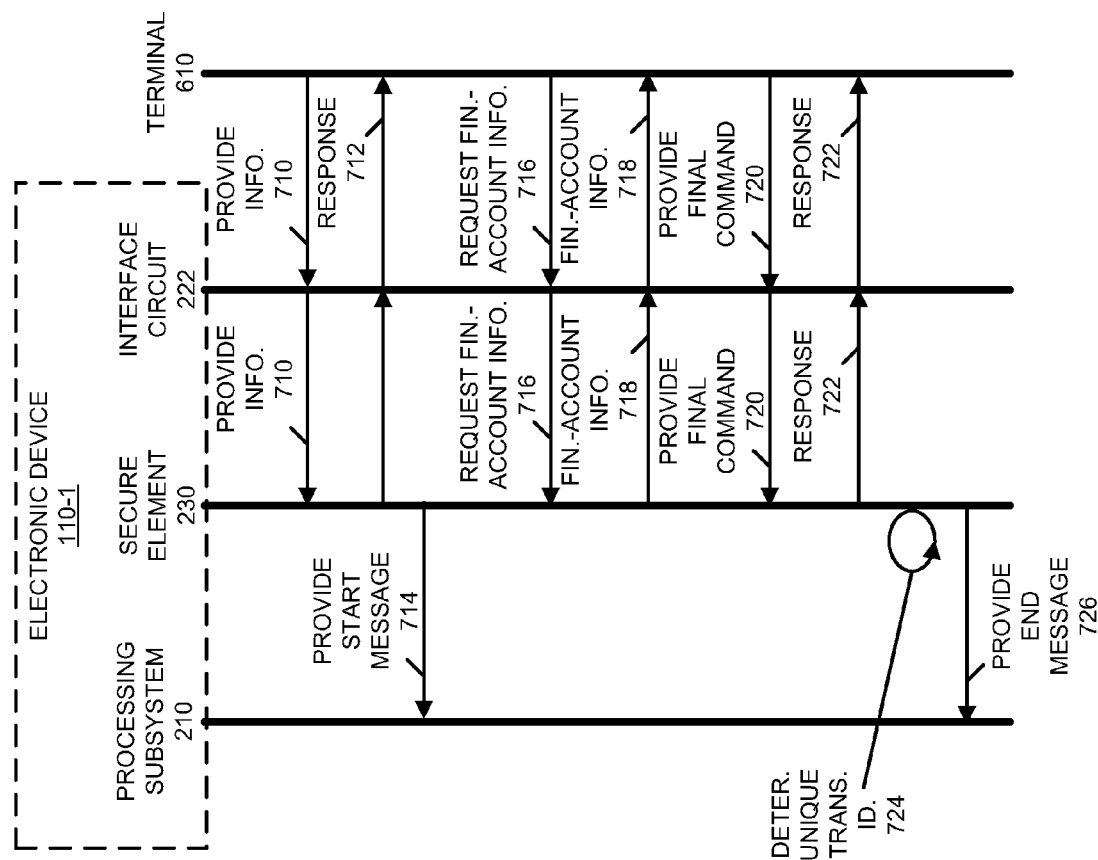
FIG. 7 is a drawing illustrating communication between the electronic devices of FIG. 1 in accordance with an embodiment of the present disclosure.

The communication between electronic devices 110-1 and 112 (FIG. 1) during the financial-transaction technique of FIG. 5 is illustrated in more detail in FIG. 7. In particular, when electronic device 110-1 is proximate to terminal 610, terminal 610 may optionally provide information 710 initiating a financial transaction (e.g., the information may specify a payment applet stored on secure element 230) to secure element 230 via interface circuit 222. (Alternatively, the payment applet may have been previously selected or activated using processing subsystem 210.) In response, the payment applet in secure element 230 may provide an optional response 712 to terminal 610 via interface circuit 222.

Subsequently, the payment applet may provide a start message 714 to processing subsystem 210 (which may be communicated via a secure enclave processor in processing subsystem 210). Note that the start message may be specific to the selected or the activated payment applet.

Moreover, terminal 610 may request 716 financial-account information associated with the payment applet in secure element 230, and the payment applet may provide financial-account information 718.

Next, terminal 610 may provide a final command 720 to the payment applet in secure element 230, and the payment applet may provide an optional response 722. Note that final command 720 may be specific to the payment applet.

Furthermore, the payment applet or another applet stored on secure element 230 may determine unique transaction identifier 724 based, at least in part, on the financial-account information. Additionally, secure element 230 may provide end message 726 for the financial transaction to processing subsystem 210. This end message may (or may not) include the unique transaction identifier, and the end message may (or may not) be communicated via the secure enclave processor.

Note that the operations illustrated in FIGS. 6 and 7 may include challenge and response operations, which are not shown for clarity.

In these ways, the electronic device may facilitate financial transactions between electronic devices 110-1 and 112 (FIG. 1) by providing end-to-end secure authentication of a user of electronic device 110-1 (FIGS. 1, 2 and 4) and/or by allowing the financial transaction to be uniquely associated (based on the unique transaction identifier) with information (such as receipt information) received by electronic device 110-1 (FIGS. 1, 2 and 4).

In some embodiments of methods 500 (FIG. 5), 600 (FIG. 6), and 700, there may be additional or fewer operations. For example, the information (such as the receipt information, the first-level information and/or the second-level information) may be communicated using one or more messages from one or more entities (such as one or more third parties). Furthermore, the order of the operations may be changed, and/or two or more operations may be combined into a single operation.

In some embodiments, touching or bringing electronic device 110-1 (FIGS. 1, 2 and 4) proximate to electronic device 112 (FIG. 1) allows a direct via peer-to-peer wireless connection (with rich-data communication) to be established. For example, near-field communication may allow an encryption/decryption key to be exchanged between electronic devices 110-1 and 112. Subsequently, wireless communication between electronic devices 110-1 and 112 (such as via Wi-Fi or Bluetooth™) may be encrypted/decrypted.

In some embodiments, the communication technique is modified to accommodate a loyalty program and/or the use of electronic or digital coupons. For example, loyalty-card information (such as a loyalty-card account number) may be communicated from electronic device 110-1 (FIGS. 1, 2 and 4) to electronic device 112 (FIG. 1) when electronic devices 110-1 and 112 (FIG. 1) are proximate to each other. In particular, the loyalty-card information may be communicated using a barcode or by providing a link to the DPAN to electronic device 112 (FIG. 1). Subsequently, the receipt information (and, in particular, the second-level information) may include a user-interface object that allows the user to opt in to a loyalty program of merchant 118 (FIG. 2). This opt-in process may be performed once or after a time interval has elapsed since the user previously opted in.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An electronic device, comprising:
a communications interface; and
one or more processors communicatively coupled to the communications interface, wherein the one or more processors and communications interface are configured to:
receive a request to initiate a transaction from a remote device;
forward the request to a secure element;
receive a start message from the secure element in response to the forwarded request, the start message indicating the initiation of the transaction; and
receive, upon completion of the transaction, an end message including a unique transaction identifier from the secure element.

2. The electronic device of claim 1, wherein the one or more processors and communications interface are further configured to determine that the transaction is unsuccessful in response to the end message not being received after the start message.

3. The electronic device of claim 1, wherein the one or more processors and communications interface are further configured to transmit a response to the remote device indicating a successful completion of the transaction.

4. The electronic device of claim 1, wherein the one or more processors and communications interface are further configured to receive a notification from a third party device relating to the transaction.

5. The electronic device of claim 4, wherein the notification includes a computed unique transaction identifier.

6. The electronic device of claim 5, wherein the one or more processors and communications interface are further configured to compare the computed unique transaction identifier to the unique transaction identifier received from the secure element to determine a match.

7. The electronic device of claim 4, wherein the one or more processors and communications interface are further configured to communicate with the remote device using a first protocol and with the third party device using a second protocol.

8. The electronic device of claim 1, wherein the one or more processors and communications interface are further configured to receive a final command relating to the transaction from the remote device.

9. The electronic device of claim 8, wherein the final command is specific to an applet associated with the secure element.

10. The electronic device of claim 1, further comprising the secure element.

11. A secure element for use by an electronic device, comprising:
a memory; and
one or more processors configured to:
receive a request to initiate a transaction from a remote device;
transmit a start message from the electronic device, the start message indicating the initiation of the transaction;
generate a unique transaction identifier for the transaction; and
transmit, upon completion of the transaction, an end message including the unique transaction identifier.

12. The secure element of claim 11, wherein the one or more processors are further configured to receive a final command from the remote device.

13. The secure element of claim 12, wherein one or more processors are configured to generate the unique transaction identifier in response to receiving the final command.

14. The secure element of claim 11, wherein to generate the unique transaction identifier, the one or more processors are configured to perform a hash of data relating to the transaction.

15. The secure element of claim 11, wherein the one or more processors are further configured to conduct the transaction using an applet running on the secure element.

16. A method of conducting a transaction, comprising:
receiving a request to initiate a transaction from a remote device;
transmitting a start message to an electronic device, the start message indicating the initiation of the transaction;
generating a unique transaction identifier for the transaction; and
transmitting an end message including the unique transaction identifier from the electronic device upon completion of the transaction.

17. The method of claim 16, further comprising receiving a final command from the remote device.

18. The method of claim 17, wherein the generating the unique transaction identifier is in response to receiving the final command.

19. The method of claim 16, wherein the generating the unique transaction identifier comprises performing a hash of data relating to the transaction.

20. The method of claim 16, further comprising conducting the transaction using an applet running on a secure element.

* * * * *